3,236,859
N-(GUANIDINOALKYL)-PYRROLIDINE DERIVATIVES

Hartmund Wollweber and Rudolf Hiltmann, Wuppertal, Hugo Wilms, Leverkusen, Hans-Gunther Kroneberg, Haan, Rhineland, and Kurt Stoepel, Wuppertal, Germany, assignors to Farbenfabriken Bayer Aktiengesellschaft, Leverkusen, Germany, a corporation of Germany
No Drawing. Filed Dec. 19, 1961, Ser. No. 160,661
Claims priority, application Germany, Dec. 24, 1960, F 32,847
3 Claims. (Cl. 260—313)

The present invention relates to novel alkylazacycloalkanes and to methods for preparing the same. More particularly, the present invention relates to the preparation of novel blood pressure depressant compounds and to novel intermediates and procedures for producing the same.

It has been known heretofore that azacycloalkane compounds containing from 6 to 8 carbon atoms in the ring structure such as, for example, [2 - (octahydro - 1 - azocinyl) ethyl] guanidine (Guanethidine, trade name), wherein the azacyclic ring contains 7 carbon atoms and which may bear only one extraneous methyl group as taught in Belgian Patent 579,482, have been suggested as possessed of blood pressure depressant activity. It has also been known that similar azacycloalkanes unsubstituted in and containing fewer carbon atoms in the ring conformation, e.g., N - (2 - quanidinoethyl) - pyrrolidine containing four carbon atoms in the ring nucleus, have a significantly lessened blood pressure depressant activity characteristically when compared with the aforesaid Guanethidine, for example.

Further, these latter compounds having a reduced azacycloalkane ring, as well as those of greater azacycloalkane structure such as the aforementioned [2-(octahydro-1-azocinyl) ethyl] guanidine sulfate evidence an undesirable sympathomimetic phase which precedes, principally, the onset of blood pressure depressant activity. In addition, compounds of the aforesaid classes induce the normally undesired side effect of marked positive inotropism.

It has also been established that alkyl substitution in the α-position of the pyrrolidine ring of 2-(guanidoalkyl)-pyrrolidine; that is the carbon or carbons connected to the nitrogen of the ring structure; leads to compounds with an activity significantly different from the recited for the pyrrolidines known heretofore and described hereinabove. Thus, of the aforesaid α-alkyl substituted pyrrolidines, 2 - (guanidinoethyl) - α,α,α',α'-tetramethyl-pyrrolidine, for example, is known to exhibit a ganglion blockage on an order of twice that of hexamethonium.

Accordingly, it has now been discovered that compounds of the following general formula:

(I) 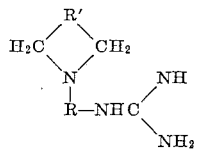

and pharmaceutically acceptable salts thereof; and particularly acid addition salts, such as, for example, the sulfate; wherein R is an alkylene radical of from 2 to 5 carbon atoms; and R' is an alkylene radical of from one to two carbon atoms in which each carbon atom is substituted by from one to two unsubstituted lower alkyl radicals, each of which contains preferably from one to three carbon atoms, and wherein from zero to one of said alkyl substituents is different from the methyl group, possess a blood pressure depressant activity which occurs substantially immediately after parenteral administration and is of a significantly enhanced strength and duration which is substantially devoid of such untoward and undesired side effects as the aforesaid sympathomimetic phase which normally precedes blood pressure depression induced by the compounds known heretofore. Further, the novel compounds of the aforesaid general Formula I do not cause ganglia blockage and have no positive inotropic action.

The compounds of this invention as encompassed by the aforesaid general Formula I above are prepared by the method which comprises reacting an N-(aminoalkyl)-azacycloalkane of the following general formula:

(II) 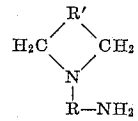

wherein each of R and R' have the values assigned above with a member selected from the group consisting of a lower alkyl isothiourea salt, and preferably one wherein the alkyl radical contains from 1 to 2 carbon atoms; cyanamide; alkali metal salts thereof, e.g., sodium cyanamide; alternatively, cyanogen halide, e.g., cyanogen bromide, cyanogen chloride, and ammonia added sequentially thereto in situ; an isourea ether, wherein the etheric alkyl moiety is lower alkyl and contains preferably from 1 to 3 carbon atoms; and guanidine, its salts, inorganic acid addition salts particularly, e.g., nitrate, sulfate, hydrochloride, and the like, and reactive derivatives thereof and their salts, e.g., acid addition salts, as well; and particularly guanidine cyanate, guanidine thiocyanate 1-guanidino-3,5-dimethylpyrazole nitrate, and 1-guanidino-3,4-dimethylpyrazole nitrate. While the temperature employed in the reaction is not narrowly critical, autogenous temperatures being normally adequate, reflux temperature and temperature ranges of, for example, up to 140° C. are preferred, particularly where the reaction involved is one employing guanidine or a salt or reactive derivative thereof.

The compounds thus prepared are strong bases, and may be employed desirably in the form of their quaternary ammonium salts or, as noted, in the form of their non-toxic acid-addition salts, the latter prepared from reaction with inorganic or organic acids to yield well crystallized stable monobasic or dibasic salts. Illustrative of the mineral acids and organic acids which provide therapeutically useful acid addition salts are, for example, phosphoric acid, hydrochloric acid, hydrobromic acid, tartaric acid, citric acid, succinic acid, maleic aid, gluconic acid, and the like; and preferably sulfuric acid.

The mode of administration is that normally employed with blood pressure depressants, e.g. intravenous or subcutaneous injection. Peroral administration is possible, too.

*Example 1.—Preparation of the monosulfate of the compound, N-(2-guanidinoethyl)-3,3,4,4-tetramethylpyrrolidine, of the formula*

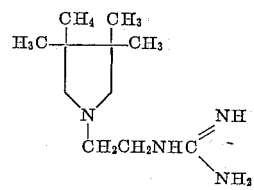

Twenty grams (20 g.) of N-(2-aminoethyl)-3,3,4,4-tetramethylpyrrolidine and 17.5 g. of S-methylisothiourea sulfate are heated under reflux for three hours in 100 cc. of alcohol and 20 cc. of water. The cooled reaction product is filtered off and recrystallied from alcohol/water. The product, N-(2-guanidinoethyl)-3,3,4,4-tetramethylpyrrolidine monosulfate, melts at 288–290° C. (decomp.).

The N-(2-aminoethyl)-3,3,4,4-tetramethylpyrrolidine of B.P. 88–90° C./14 mm. Hg, employed as starting material, is prepared by the following method: 3,3,4,4-tetramethylpyrrolidine, of B.P. 161–162° C./760 mm. Hg and M.P. 134° C. is obtained by catalytic hydrogenation of tetramethylsuccinic acid dinitrile or by reduction of tetramethylsuccinimide with lithium aluminum hydride. Addition of glycol nitrile to 3,3,4,4-tetramethylpyrrolidine produces N-(cyanomethyl)-3,3,4,4-tetramethylpyrrolidine of B.P. 60–62° C./0.5 mm. Hg, which is reduced by lithium aluminum hydride.

*Example 2.—Preparation of the monosulfate of the compound, N-(2-guanidinoethyl)-3,3-dimethylpyrrolidine, of the formula*

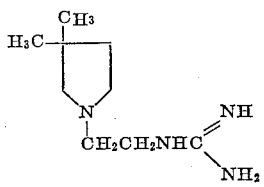

A solution of equivalent amounts of monosodium cyanamide and N-(2-aminoethyl)-3,3-dimethylpyrrolidine monosulfate is heated under reflux in water for eight hours. The mixture is treated with an equivalent amount of sulfuric acid, exaporated in vacuo, filtered off after the addition of alcohol, and N-(2-guanidinoethyl)-3,3-dimethylpyrrolidine monosulfate, M.P. 228–230° C. (decomp.), is recrystallized from water.

The starting material, N-(2-aminoethyl)-3,3-dimethylpyrrolidine, B.P. 74° C./12 mm. Hg, is obtained according to the method described in Example 1; that is, α,α-dimethylsuccinimide, B.P. 136–140° C./12 mm. Hg and M.P. 105–106° C., is reduced catalytically to 3,3-dimethylpyrrolidone, B.P. 120° C./12 mm. Hg. This compound is then further reduced with lithium aluminum hydride to the corresponding 3,3-dimethylpyrrolidine. Addition of glycol nitrile to this latter compound yields N-(cyanomethyl)-3,3-dimethylpyrrolidine, B.P. 84° C./12 mm. Hg, which is in turn reduced with lithium aluminum hydride to the aforesaid N-(2-aminoethyl)-3,3-dimethylpyrrolidine.

*Example 3.—Preparation of the monosulfate of the compound, N-(2-guanidinoethyl)-3,3-dimethylpyrrolidine, of the formula*

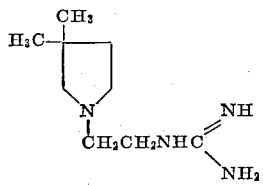

Twenty grams (20 g.) of N-(2-aminoethyl)-3,3-dimethylpyrrolidine are heated under reflux for ten hours with 7 g. of 1-guanidino-3,4-dimethylpyrazole nitrate in 100 cc. of alcohol. The solvent and the unreacted starting material are distilled off in vacuo, the reaction product is taken up in methanol and a little water, passed over a strongly basic ion exchanger, and the free base is converted with dilute sulfuric acid into N-(2-guanidinoethyl)-3,3-dimethylpyrrolidine monosulfate, M.P. 228–230° C. (decomp.).

*Example 4.—Preparation of the monosulfate of the compound, N-(2-guanidinoethyl)-3,3-dimethylpyrrolidine, of the formula*

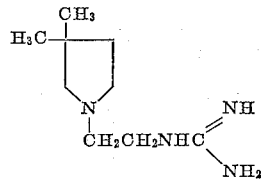

Thirty grams (30 g.) of N-(2-aminoethyl)-3,3-dimethylpyrrolidine are heated at 120–140° C. for three hours with 30 g. of guanidine thiocyanate. After the reaction is completed, the product is taken up in methanol and a little water, passed over a basic ion exchanger, and the free base is converted with dilute sulfuric acid into N-(2-guanidinoethyl)-3,3-dimethylpyrrolidine monosulfate, M.P. 228–230° C. (decomp.).

*Example 5.—Preparation of the monosulfate of the compound, N-(2-guanidinoethyl)-3,4-dimethylpyrrolidine, of the formula*

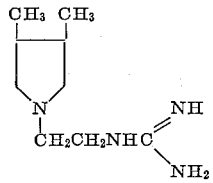

The following reactants, 13.8 g. of N-(2-aminoethyl)-3,4-dimethylpyrrolidine and 13.6 g. of S-methylisothiourea sulfate are heated under reflux for one hour in 60 cc. of alcohol and 10 cc. of water. After the reaction is completed, air is blown through the reaction solution in order to remove the methylmercaptan formed, and the N-(2-guanidinoethyl)-3,4-dimethylpyrrolidine monosulfate is then filtered off. M.P. 213–215° C. (decomp.).

The N-(2-aminoethyl)-3,4-dimethylpyrrolidine, B.P. 70° C./12 mm. Hg, is obtained according to the procedure described in Example 1. That is, 3,4-dimethylpyrrolidine, B.P. 116° C.–118° C./760 mm. Hg is obtained by reduction of 3,4-dimethylsuccinimide, B.P. 140° C./12 mm. Hg with lithium aluminum hydride. Addition of glycol nitrole to the 3,4-dimethylpyrrolidine so produced yields N-(cyanomethyl)-3,4-tetramethylpyrrolidine, B.P. 60° C.–62° C./0.5 mm. Hg, which is then reduced with lithium aluminum hydride to the aforesaid N-(2-aminoethyl)-3,4-dimethylpyrrolidine.

*Example 6.—Preparation of the monosulfate of the compound, N-(2-guanidinoethyl)-3,3,4-trimethylpyrrolidine, of the formula*

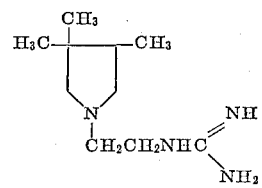

The compound, N-(2-guanidinoethyl)-3,3,4-trimethylpyrrolidine monosulfate of M.P. 247° C.–249° C. (decomp.) is prepared by the procedure of Example 1, from the corresponding N-(2-aminoethyl)-3,3,4-trimethylpyrrolidine, B.P. 80° C./12 mm. Hg. This latter compound is prepared in the manner of Example 2 by reduction of trimethylsuccinimide, B.P. 130° C.–135° C./12 mm. Hg and M.P. 120° C.–121° C. to 3,3,4-trimethylpyrrolidone, B.P. 120° C.–125° C./12 mm. Hg and M.P. 68° C., and 3,3,4-trimethylpyrrolidine, B.P. 125° C.–130° C./760 mm. Hg, successively, with lithium aluminum hydride, the latter pyrrolidine being then reacted with glycol nitrile to yield N-(cyanomethyl)-3,3,4-trimethylpyrrolidine, B.P. 86° C./12 mm. Hg; which is, in turn, reduced with lithium aluminum hydride to yield the N-(2-aminoethyl)-3,3,4-trimethylpyrrolidine.

*Example 7.—Preparation of the monosulfate of the N - (2-guanidinoethyl)-3-methyl-3-ethylpyrrolidine, of the formula*

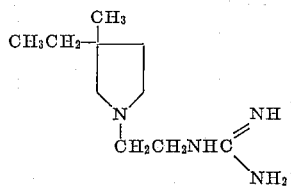

The compound, N - (2 - guanidinoethyl)-3-methyl-3-ethylpyrrolidine monosulfate, M.P. 220° C.–222° C. (decomp.), is prepared by the procedure of Example 1 from the corresponding N-(2-aminoethyl)-3-methyl-3-ethylpyrrolidine, B.P. 80° C./12 mm. Hg. This latter compound is prepared according to the procedure of Example 1 by reduction of α-methyl-α-ethyl succinimide, B.P. 110° C./0.1 mm. Hg, to 3-methyl-3-ethylpyrrolidine, B.P. 140° C.–142° C./760 mm. Hg, with lithium aluminum hydride. The pyrrolidine, thus prepared, is reacted with glycol nitrile to yield N-(cyanomethyl)-3-methyl-3-ethylpyrrolidine, B.P. 88° C.–90° C./12 mm. Hg; which is, in turn reduced with lithium aluminum hydride to yield the aforesaid N-(2-aminoethyl)-3-methyl-3-ethylpyrrolidine.

What is claimed is:

1. A chemical compound selected from the group consisting of N-(2-guanidinoethyl)-3,3,4,4-tetramethylpyrrolidine and N-(2-guanidinoethyl)-3,3-dimethylpyrrolidine, and the sulfate salts thereof.
2. The compound, N-(2-guanidinoethyl)-3,3,4,4-tetramethylpyrrolidine.
3. The compound, N-(2-guanidinoethyl)-3,3-dimethylpyrrolidine.

References Cited by the Examiner
UNITED STATES PATENTS 2,928,829   3/1960   Mull _____ 260—239
3,006,913  10/1961   Mull _____ 260—239

OTHER REFERENCES

Degering, Organic Nitrogen Compounds, 1950, pages 464–68.

Sidgwick, Organic Chemistry of Nitrogen, 1937, page 468.

NICHOLAS S. RIZZO, *Primary Examiner.*

IRVING MARCUS, WALTER A. MODANCE,
*Examiners.*

UNITED STATES PATENT OFFICE
CERTIFICATE OF CORRECTION

Patent No. 3,236,859                                   February 22, 1966

Hartmund Wollweber et al.

It is hereby certified that error appears in the above numbered patent requiring correction and that the said Letters Patent should read as corrected below.

Column 2, lines 61 to 68, the formula should appear as shown below instead of as in the patent:

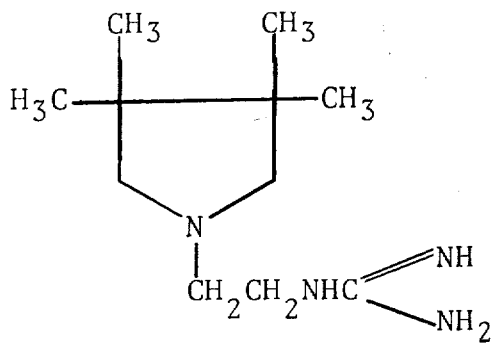

Signed and sealed this 24th day of January 1967.

(SEAL)
Attest:

ERNEST W. SWIDER                                        EDWARD J. BRENNER
Attesting Officer                                   Commissioner of Patents